(12) United States Patent
Dalluge et al.

(10) Patent No.: US 8,752,809 B2
(45) Date of Patent: Jun. 17, 2014

(54) METHODS AND APPARATUS TO COUPLE VALVE SHAFTS AND CLOSURE MEMBERS

(75) Inventors: Paul Russell Dalluge, Marshalltown, IA (US); Ross Eugene Long, State Center, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 647 days.

(21) Appl. No.: 12/716,934

(22) Filed: Mar. 3, 2010

(65) Prior Publication Data

US 2011/0214288 A1 Sep. 8, 2011

(51) Int. Cl.
*F16K 1/22* (2006.01)
*F16K 51/00* (2006.01)

(52) U.S. Cl.
USPC ..................... 251/308; 137/315.24

(58) Field of Classification Search
USPC ............... 251/305, 308; 137/15.25, 15.18, 137/315.16, 315.22, 315.24; 403/379.4, 403/409.1, 109.5, 374.1
See application file for complete search history.

(56) References Cited

U.S. PATENT DOCUMENTS

| | | | |
|---|---|---|---|
| 3,517,689 A * | 6/1970 | Roos | 137/329.01 |
| 4,464,076 A * | 8/1984 | Leibhard | 403/297 |
| 4,483,513 A | 11/1984 | Summers | |
| 4,496,135 A * | 1/1985 | Scobie | 251/308 |
| 4,711,427 A * | 12/1987 | Holtgraver | 251/308 |
| 4,768,750 A | 9/1988 | Wilson | |
| 5,344,252 A * | 9/1994 | Kakimoto | 403/358 |
| 5,743,512 A * | 4/1998 | Greenberg | 251/307 |
| 6,357,960 B1 * | 3/2002 | Cornelius et al. | 403/381 |

FOREIGN PATENT DOCUMENTS

| | | |
|---|---|---|
| EP | 0101053 | 2/1984 |
| EP | 0275247 | 7/1988 |
| WO | 2008079175 | 7/2008 |

OTHER PUBLICATIONS

Emerson Process Management, "Type A11 High Performance Butterfly Valve," Instruction Manual, Feb. 2007, 24 pages.
Emerson Process Management, "Fisher Posi-Seal A81 Rotary Valve," Product Bulletin, Dec. 2009, 16 pages.
Emerson Process Management, "Fisher Vee-Ball SS-84PSV4 NPS 4x3 Rotary Control Valve," Instruction Manual, Dec. 2009, 16 pages.
Emerson Process Management, "Fisher 8532 High-Performance Butterfly Valve," Product Bulletin, Sep. 2009, 16 pages.

(Continued)

*Primary Examiner* — Elizabeth Houston
*Assistant Examiner* — Michael R Reid
(74) *Attorney, Agent, or Firm* — Hanley, Flight & Zimmerman, LLC

(57) ABSTRACT

Methods and apparatus to couple valve shafts and closure members are described. An example coupling apparatus includes an expansion pin to be disposed in a bore defined by a first aperture of a valve shaft and a second aperture of a closure member. The first and second apertures are coaxially aligned when the valve shaft is coupled to the closure member. A first tapered pin is disposed in a first opening of the expansion pin adjacent a first end of the expansion pin and a second tapered pin is disposed in a second opening of the expansion pin adjacent a second end of the expansion pin. The first tapered pin causes the expansion pin to expand at a first location when the first tapered pin is disposed in the first opening and the second tapered pin causes the expansion pin to expand at a second location different than the first location when the second tapered is disposed in the second opening.

21 Claims, 4 Drawing Sheets

(56) References Cited

OTHER PUBLICATIONS

International Searching Authority, "International Search Report," issued in connection with international application serial No. PCT/US2011/021163, mailed Apr. 26, 2011, 4 pages.

International Searching Authrotiy, "Written Opinion of the International Searching Authority," issued in connection with international application serial No. PCT/US2011/021163, mailed Apr. 26, 2011, 6 pages.

\* cited by examiner

METHODS AND APPARATUS TO COUPLE VALVE SHAFTS AND CLOSURE MEMBERS

FIELD OF THE DISCLOSURE

This disclosure relates generally to fluid valves and, more particularly, to methods and apparatus to couple valve shafts and closure members.

BACKGROUND

Valves are commonly used in process control systems to control the flow of process fluids. Rotary valves (e.g., butterfly valves) typically have a closure member (e.g., a disc) disposed in a fluid path. A shaft operatively couples the closure member to an actuator that rotates the closure member between an open position and a closed position to allow or restrict fluid flow between an inlet and an outlet of the valve. When the closure member is rotated to the closed position, the closure member sealingly engages a valve seat or sealing surface (e.g., a seal ring fixed to the valve body) to restrict fluid flow through the valve.

To couple the valve shaft and the closure member, a hole or aperture is typically formed in a portion of the closure member parallel to a face of the closure member. At least one fastener (e.g., a pin) is employed to couple the valve shaft and the closure member. In particular, the fastener may be disposed in the aperture of the closure member and a coaxially aligned aperture of the valve shaft to couple the valve shaft and the closure member.

However, in relatively larger valves such as valves having diameters greater than 12 inches, it may be impractical to form (e.g., via a drill) an aperture (e.g., a blind hole) that is parallel to the face of the closure member. Instead, the aperture is typically formed substantially perpendicular to the face of the closure member and the fastener, which is disposed in the aperture, couples the valve shaft and the closure member. However, such a connection or coupling may exhibit lost motion between the valve shaft and the closure member because the fastener may back out of the aperture due to valve vibrations during operation. Thus, such a connection often requires permanent attachment (e.g., via welding) of the fastener to the valve shaft and/or the closure member.

SUMMARY

A coupling apparatus described herein includes an expansion pin to be disposed in a bore defined by a first aperture of a valve shaft and a second aperture of a closure member. The first and second apertures are coaxially aligned when the valve shaft is coupled to the closure member. A first tapered pin is disposed in a first opening of the expansion pin adjacent a first end of the expansion pin and a second tapered pin is disposed in a second opening of the expansion pin adjacent a second end of the expansion pin. The first tapered pin causes the expansion pin to expand at a first location when the first tapered pin is disposed in the first opening and the second tapered pin causes the expansion pin to expand at a second location different than the first location when the second tapered is disposed in the second opening.

In another example, a method of coupling a closure member and a valve shaft described herein includes inserting a first tapered pin in a first opening adjacent a first end of an expansion pin such that a first portion of the expansion pin adjacent the first end does not expand. The method includes disposing the expansion pin and the first tapered pin in a receiving bore of a closure member and a valve shaft such that the first tapered pin engages a surface of the receiving bore adjacent a face of the closure member. The method further includes driving the expansion pin toward the first tapered pin to cause the first portion adjacent the first end of the expansion pin to expand against an inner surface of the receiving at a first location and disposing a second tapered pin in a second opening of the expansion pin to cause a second portion adjacent a second end of the expansion pin to expand against the inner surface of the receiving bore at a second location different from the first location.

In yet another example, a coupling apparatus described herein includes means for coupling a valve shaft and a closure member. The means for coupling comprises a first means for causing an expansion pin disposed within a bore of the valve shaft and the closure member to expand at a first location of the bore and second means for causing the expansion pin to expand at a second location of the bore different than the first location.

DETAILED DESCRIPTION

Generally, the example methods and apparatus described herein may be used to mechanically couple a closure member to a valve shaft of a rotary valve. The example coupling apparatus described herein are particularly advantageous for use with closure members having relatively large diameters and surface areas such as, for example, closure members having diameters greater than 12 inches. However, the example methods and apparatus may be generally applied for use with fluid valves of any size, type, and/or geometry. In one example, the valve shaft and the closure member have respective bores or openings that are substantially perpendicular to a face of the closure member and sized or dimensioned to receive the coupling apparatus. The coupling apparatus may include an expansion pin and at least two fasteners or tapered pins to be received by respective first and second openings of the expansion pin. To couple the closure member and the valve shaft, the expansion pin and the tapered pins are disposed in the co-axially aligned bores of the closure member and the valve shaft. In particular, the tapered pins cause the expansion pin to expand and frictionally engage the bores of the closure member and the valve shaft at two or more different locations. In other words, a first tapered pin causes a first portion of the expansion pin to expand at a first location and a second tapered pin causes a second portion of the expansion pin to expand at a second location different from the first location.

Additionally, the tapered pins and an inner surface of the expansion pin are configured (e.g., to matably engage) such that if the expansion pin moves or slides relative to one of the tapered pins, the other one of the tapered pins cause the expansion pin to expand, thereby preventing further movement of the expansion pin relative to the tapered pins. In this manner, the coupling apparatus provides a self-locking assembly, thereby eliminating the need to permanently attach the coupling apparatus to the closure member and the valve shaft via, for example, welding. Additionally, the example coupling apparatus described herein expands at the most critical areas of the closure member and valve shaft interface to substantially reduce or eliminate lost motion between the closure member and the valve shaft.

Figure 1A:
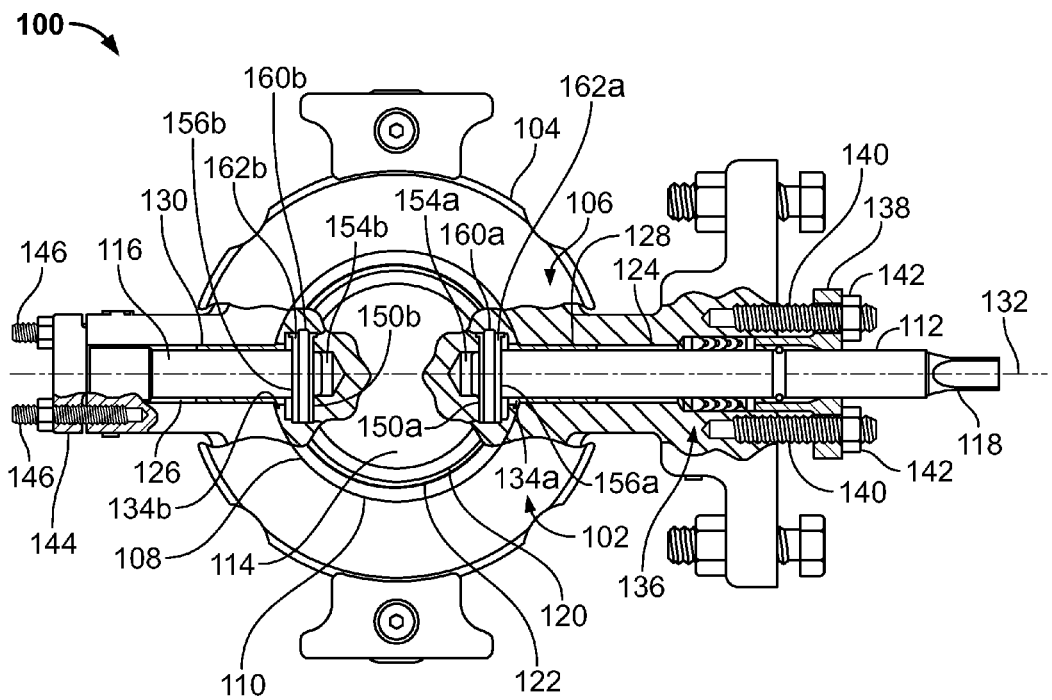
FIGS. 1A and 1B illustrate a known fluid valve having a known coupling apparatus substantially parallel to a face of a closure member.
Figure 1B:
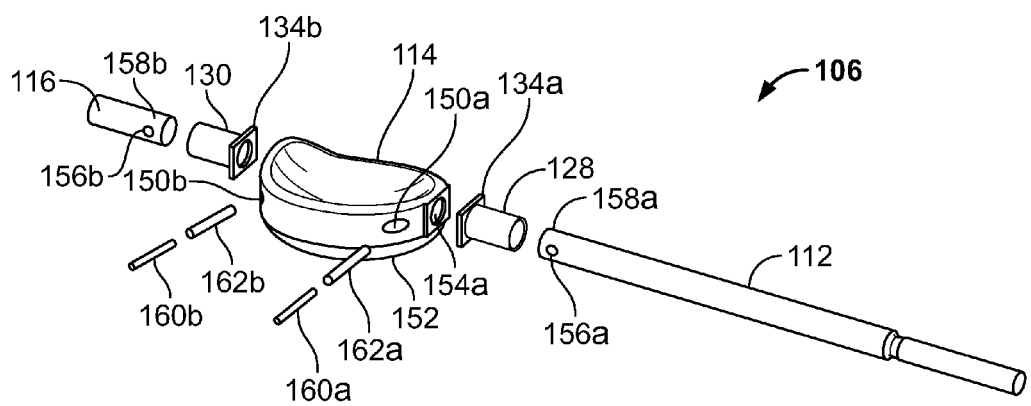

Before describing the example methods and apparatus, a brief discussion of a known fluid valve 100 is provided in connection with FIGS. 1A and 1B. FIG. 1A illustrates a cross-sectional view of the fluid valve 100. FIG. 1B illustrates a perspective view of a known coupling apparatus 102 of FIG. 1A.

Referring to FIGS. 1A and 1B, the valve 100 includes a valve body 104 that houses a valve trim 106. The valve body 104 is generally cylindrical and has a central opening 108 that defines a fluid flow passageway between an inlet 110 and an outlet (opposite the inlet 110). As shown, the valve trim 106 includes a valve shaft 112, a closure member 114 (e.g., a disc), and a follower shaft 116. In some examples, the valve shaft 112 and the follower shaft 116 may be of unitary or single piece construction. A second end 118 (e.g., a splined end, a square end, etc.) of the valve shaft 112 operatively couples the closure member 114 to an actuator (not shown) via, for example, a lever (not shown). The closure member 114 is disposed within the fluid flow passageway and has a peripheral edge 120 that sealingly engages a valve seat or annular sealing surface 122 (e.g., a seal ring) disposed in the central opening 108 to prevent fluid flow through the valve 100 when the valve 100 is in a closed position. In the illustrated example, the closure member 114 is depicted as a disc. However, in other examples, the closure member 114 can be any suitable closure member 114 such as, for example, a ball valve, a segmented ball valve, vee-ball valve, etc.

The valve body 104 also has a drive end opening 124 and a follower end opening 126 that are generally coaxially aligned and adapted to receive the valve shaft 112 and the follower shaft 116, respectively. Bearings 128 and 130 are disposed in the respective openings 124 and 126 between the valve body 104 and the valve shaft 112 and the follower shaft 116, respectively. The bearings 128 and 130 align the closure member 114 along an axis 132 and bearing flanges 134a and 134b align (i.e., center) the closure member 114 relative to the central opening 108 and the valve body 104. The bearings 128 and 130 also aid the shafts 112 and 116 in alignment and rotation and reduce friction between the respective shafts 112 and 116 and the valve body 104.

The valve 100 may include a packing 136 that is disposed in the opening 124 of the valve body 104 and which engages the valve shaft 112 to provide a seal and prevent leakage of process fluid past the valve shaft 112 along the axis 132. A packing flange 138 adjusts and retains the packing 136 within the valve body 104 and couples to the valve body 104 via packing flange studs 140 and nuts 142. An end cap 144 retains the follower shaft 116 within the opening 126 and is coupled to the valve body 104 via fasteners 146. Although not shown, a packing may also be disposed in the opening 126.

In operation, the actuator applies or exerts a torque to the valve shaft 112 via a lever to drive (e.g., rotate) the closure member 114 between an open position to allow fluid flow through the valve 100 and a closed position to restrict or prevent fluid flow through the valve 100. The closure member 114 sealingly engages the sealing surface 122 (e.g., a seal ring) to effect a seal and provide a shutoff (i.e., prevent the flow of fluid through the valve 100).

In this example, the closure member 114 includes openings or apertures 150a and 150b (e.g., tapered apertures or straight apertures) adjacent the peripheral edge 120 of the closure member 114 and substantially parallel to a face 152 of the closure member 114. Additionally, the closure member 114 includes openings 154a and 154b substantially perpendicular to the apertures 150a and 150b, respectively. The valve shaft 112 includes an aperture or bore 156a (e.g., a tapered aperture or straight opening) adjacent an end 158a of the valve shaft 112 and the follower shaft 116 includes an aperture or bore 156b (e.g., a tapered aperture or straight opening) adjacent an end 158b of the follower shaft 116.

To couple the valve shaft 112 and the follower shaft 116 to the closure member 114, the ends 158a and 158b of the valve shaft 112 and the follower shaft 116 are received by the respective openings 154a and 154b of the closure member 114. The aperture 156a of the valve shaft 112 is aligned with the aperture 150a of the closure member 114 and a pin 160a is disposed in the apertures 150a and 156a to couple the valve shaft 112 and the closure member 114. Additionally, as shown, an expansion pin 162a to receive the pin 160a may be disposed in the apertures 150a and 156a. An outer surface of the pin 160a may have a tapered profile and an interior surface of the expansion pin 162a may also include a tapered profile so that as the pin 160a is pressed into the expansion pin 162a, the expansion pin 162a expands so that an outer surface of the expansion pin 162a is forced into contact with an inner surface of the aperture 150a and/or the aperture 156a to couple the closure member 114 and the valve shaft 112.

Likewise, the aperture 156b of the follower shaft 116 is substantially coaxially aligned with the aperture 150b of the closure member 114 and a pin 160b and/or an expansion pin 162b are inserted or disposed in the apertures 150b and 156b to couple the follower shaft 116 and the closure member 114. Thus, the closure member 114 is operatively coupled to the first end 158a of the valve shaft 112 and to the first end 158b of the follower shaft 116 via pins 160a, 162a and 160b, 162b, respectively.

As shown, because the diameter of the closure member 114 is relatively small (e.g., less than 12 inches), the apertures 150a and 150b of the closure member 114 may be adjacent the peripheral edge 120 and substantially parallel to the face 152 of the closure member 114. In this manner, the pins 160a and 160b are parallel to the face 152 of the closure member 114 and can provide a tight engagement between the shafts 112 and 116 and the closure member 114 at an outer diameter of the shafts 112 and 116 and, thus, spaced from the axis 132 of rotation of the closure member 114. As a result, lost motion between the valve shaft 112 and the closure member 114 is significantly reduced or eliminated when the actuator applies a torque to the valve shaft 112.

However, such a coupling configuration may not be practical for closure members having relatively large diameters (e.g., diameters greater than 12 inches) due to the length-to-diameter ratio (i.e., the depth of the apertures 150a and 150b relative to the diameter of closure member 114) becoming relatively large or excessive. For example, to properly couple a valve shaft to a closure member having a diameter larger than 12 inches, the depth or length of an aperture (e.g., the aperture 150a) formed substantially parallel to a face (e.g., the face 152) of a closure member may require a relatively large depth. As a result, such length-to-diameter ratios typically presents difficulties for tools (e.g., a drill) used to form such an aperture.

Further, coupling apparatus for use with relatively large length-to-diameter ratios typically have pins that are relatively longer in length. As a result, pins having relatively longer lengths are more prone to failure due to the stress levels exerted on the pin during operation of the valve shaft and the closure member when the actuator imparts a torque on the valve shaft to rotate the closure member. Thus, to withstand the torque loads exerted by an actuator that may occur during valve shaft rotation, the size and/or diameter of the pins must be relatively large. Therefore, it may be impractical to couple a closure member and a valve shaft via pins that are parallel to a face of the closure member for closure members having relatively large diameters (e.g., greater than 12 inches).

Figure 2A:
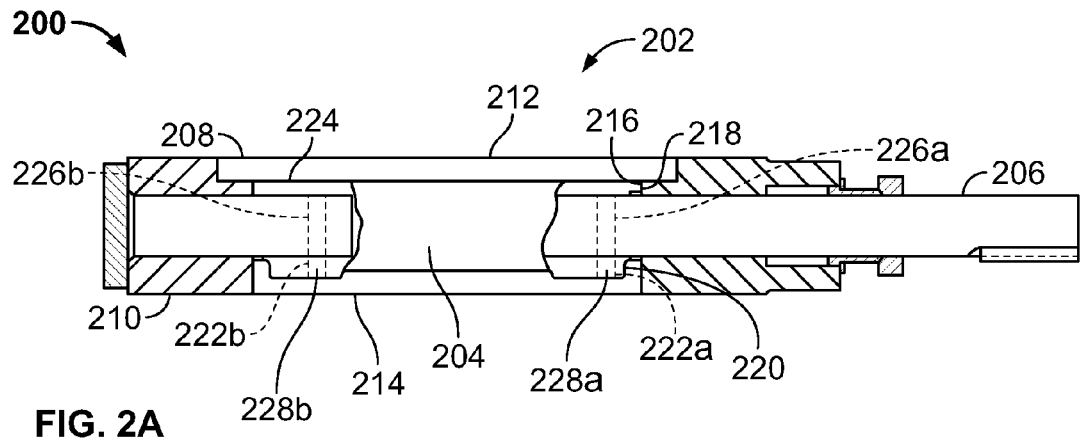
FIGS. 2A and 2B illustrate another known example fluid valve having another known coupling apparatus substantially perpendicular to a face of a closure member.
Figure 2B:
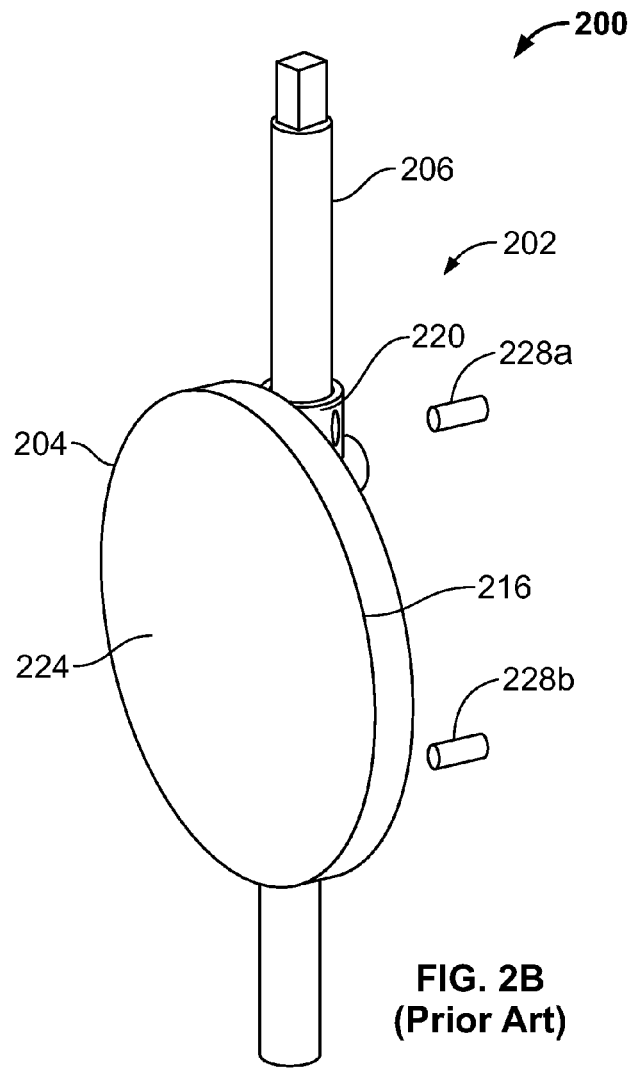

FIGS. 2A and 2B illustrate another known valve 200 having a known coupling apparatus 202 typically used with closure members having diameters greater than 12 inches. FIG. 2A illustrates a cross-sectional view of the fluid valve 200. FIG. 2B illustrates a perspective and partially exploded view of a known valve shaft 206, a closure member 204, and the coupling apparatus 202.

Referring to FIGS. 2A and 2B, the closure member 204 (e.g., a disc having a diameter greater than 12 inches) is disposed within a fluid flow passageway 208 of a valve body 210 between an inlet 212 and an outlet 214. The closure member 204 moves between a first position to allow fluid flow through the passageway 208 and a second position to prevent fluid flow through the passageway 208. A peripheral edge 216 of the closure member 204 sealingly engages a valve seat or annular sealing surface 218 (e.g., a seal ring) disposed in the passageway 208 to prevent fluid flow through the valve 200 when the valve 200 is in a closed position. An actuator (not shown) moves the closure member 204 between the first and second positions via the valve shaft 206 and a lever (not shown).

The closure member 204 includes a body portion 220 that slidably receives the valve shaft 206. In contrast to the closure member of FIGS. 1A and 1B, the closure member 204 of FIGS. 2A and 2B includes apertures 222a and 222b that are substantially perpendicular to a face 224 of the closure member 204. The valve shaft 206 also includes apertures 226a and 226b that are to substantially align with the respective apertures 222a and 222b of the body portion 220 when the valve shaft 206 is coupled to the closure member 204. Pins 228a and 228b are disposed in the respective apertures 222a and 222b of the closure member 204 and the apertures 226a and 226b of the valve shaft 206 to couple the valve shaft 206 and the closure member 204.

The known coupling apparatus 202 of FIGS. 2A and 2B lacks a self-locking configuration and, thus, may exhibit lost motion between the valve shaft 206 and the closure member 204 when the actuator moves the closure member 204. In other words, the pins 228a and 228b may not provide a tight friction fit to support the relatively high torque loads that may be imparted to the valve shaft 206 during operation. In some examples, the pins 228a and 228b are permanently disposed or staked in position (e.g., via welding, mechanical deformation, chemical bonding, etc.) relative to the valve shaft 206 and the closure member 204 to prevent the pins 228a and/or 228b from backing out of the apertures 222a and 226a and/or 222b and 226b due to vibrations during operation of the fluid valve 200. Often, the pins 228a and 228b are welded within the respective apertures 222a, 226b and/or 222a and 226b to provide a connection that can withstand the torque loads imparted by the actuator on the valve shaft 206. As a result, to disassemble the closure member 204 and the valve shaft 206, the pins 228a and 228b must be removed via, for example, a tool (e.g., a drill, a reamer, etc.).

Further, if a single tapered pin and a tapered expansion pin are employed with the configuration of FIGS. 2A and 2B, the tapered pin will cause only a portion of the expansion pin to expand and engage the closure member 204 and/or the valve shaft 206 at a single location where the valve shaft 206 engages the closure member 204. In other words, the tapered pin will only expand the expansion pin at a first portion or end of the expansion pin, while a second end or portion of the connection between the valve shaft 206 and the closure member 204 has a relatively loose connection, which may result in lost motion between the valve shaft 206 and the closure member 204 during operation.

Although not shown, other example coupling apparatus for use with closure members having diameters greater than 12 inches include straight pins that tangentially interface with, for example, a notched portion or an outer surface of a valve shaft to couple the valve shaft and the closure member. However, such coupling apparatus typically require permanent attachment to prevent the pin(s) from backing out of engagement with the notched portion of the outer surface of the valve shaft. Further, such configurations require the use of matching sets of closure members, disc shafts and pins due to the notched portion of the valve shaft and may, as with other known configurations, exhibit lost motion between a valve shaft and a closure member during operation.

Figure 3:
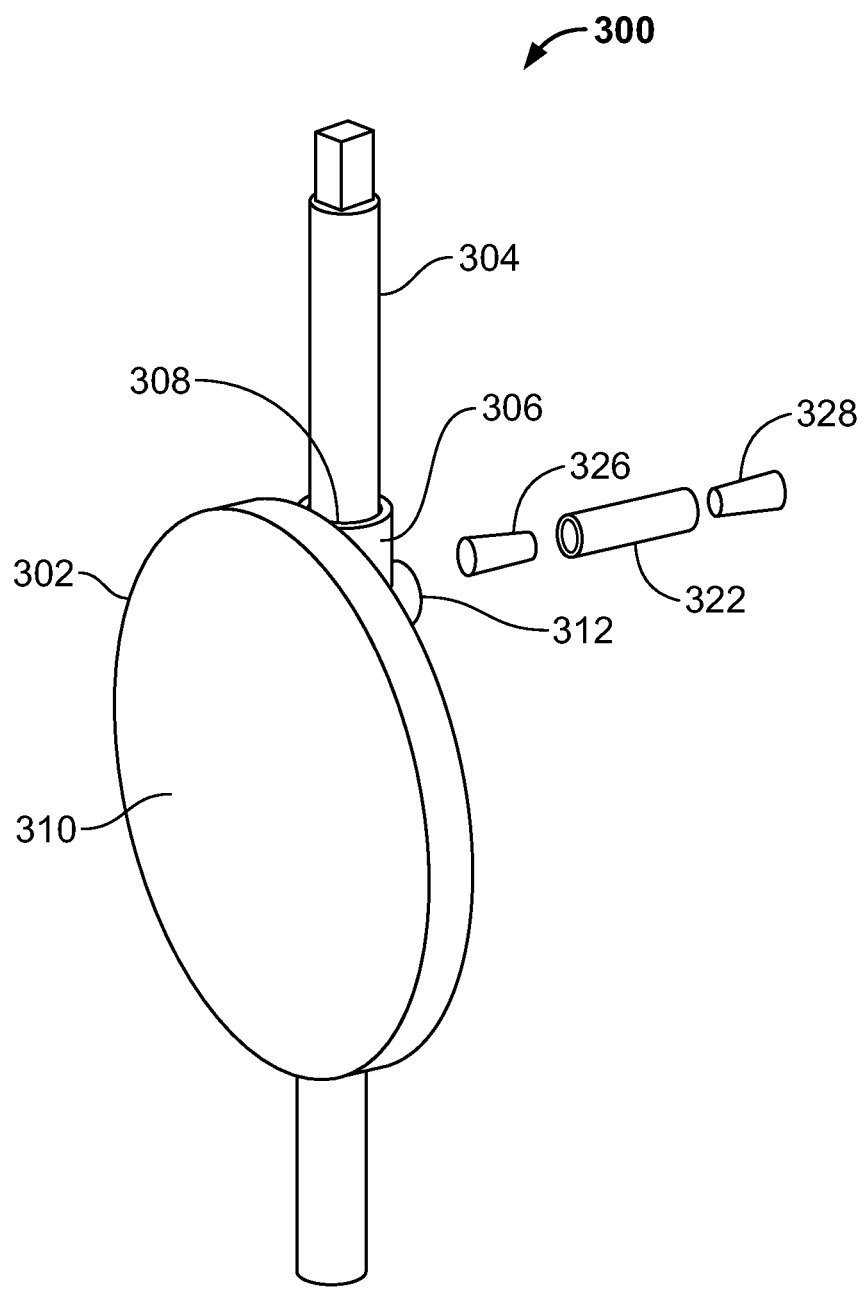
FIG. 3 illustrates a perspective view of an example coupling apparatus described herein.
Figure 4:
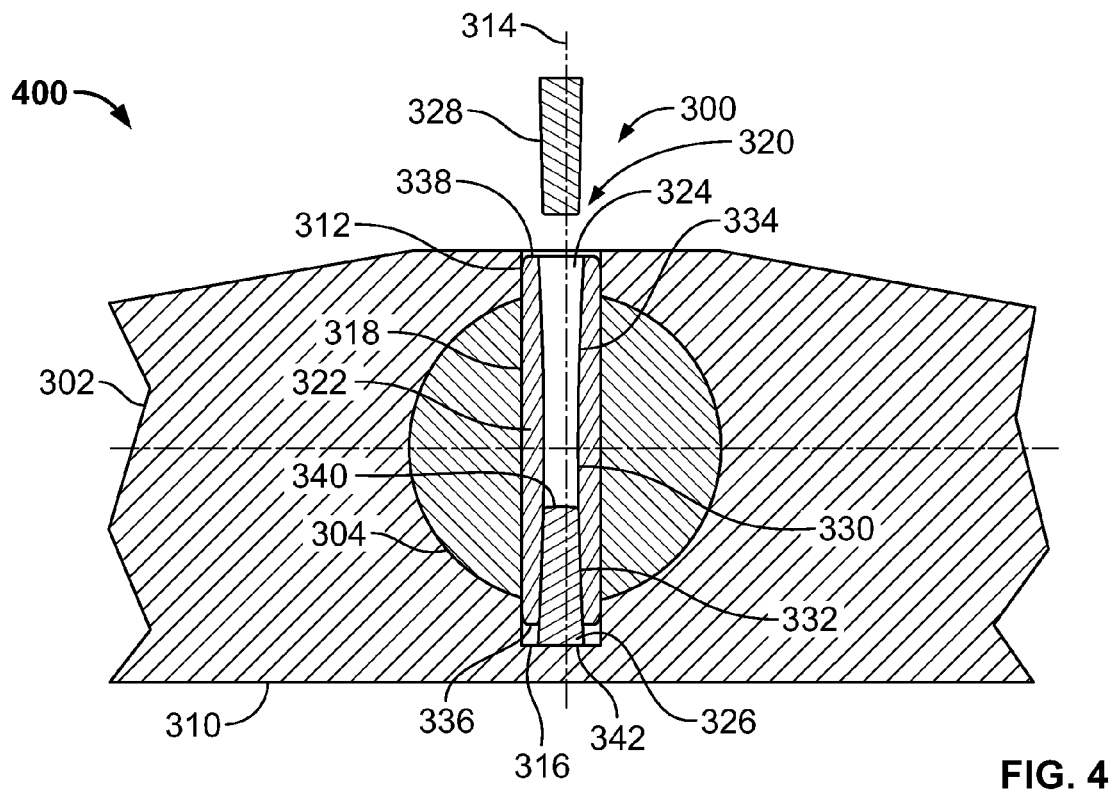
FIG. 4 is a cross-sectional view of the example coupling apparatus shown in FIG. 3, but shown in a partially assembled condition.
Figure 5:
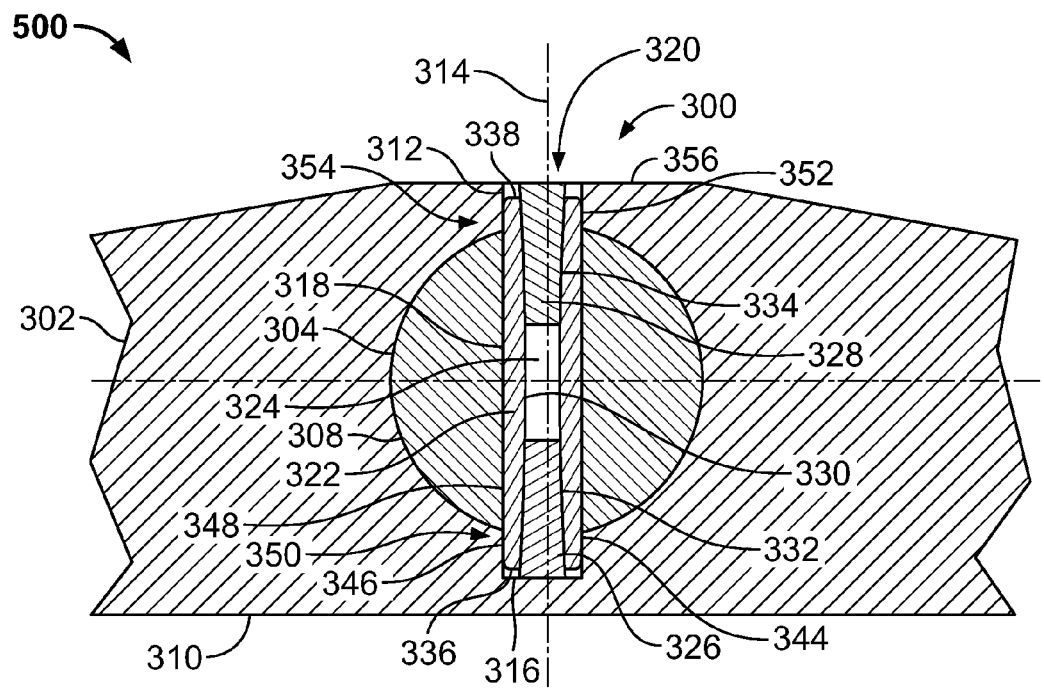
FIG. 5 is a cross-sectional view of the example coupling apparatus shown in FIGS. 3 and 4, but shown in an assembled condition.

FIGS. 3-5 illustrate an example coupling apparatus 300 described herein. FIG. 3 illustrates a perspective and partially exploded view of a closure member 302 and a valve shaft 304 coupled together via the coupling apparatus 300 described herein. FIG. 4 is a cross-sectional view of the closure member 302 and the valve shaft 304 of FIG. 3 showing the coupling apparatus 300 in a partially assembled state 400. FIG. 5 illustrates a cross-sectional view of the closure member 302 and valve shaft 304 of FIGS. 3 and 4 showing the coupling apparatus 300 in an assembled state 500.

Referring to FIGS. 3-5, the example closure member 302 includes a body portion 306 having a longitudinal aperture or opening 308 to slidably receive the valve shaft 304. The opening 308 is substantially parallel to a face 310 of the closure member 302. Additionally, the body portion 306 includes at least one aperture 312 having an axis 314 that is substantially perpendicular to the face 310 of the closure member 302. However, as shown in FIGS. 4 and 5, the aperture 312 of the closure member 302, although perpendicular to the face 310, does not extend through the face 310 of the closure member 302, but is recessed within the body portion 306 of the closure member 302 such that a surface 316 of the aperture is adjacent the face 310. Further, the valve shaft 304 also includes an aperture 318 that is to substantially align with the aperture 312 of the closure member 302 when the valve shaft 304 is coupled to the closure member 302. The aperture 312 and/or the aperture 318 may be formed during manufacturing or in the field. When aligned, the apertures 312 and 318 define or form a receiving bore 320. The coupling apparatus 300 is coupled to or disposed in the receiving bore 320 to couple the valve shaft 304 and the closure member 302 as described in greater detail below. In other examples, the apertures 312 and 318 can be formed at any angle relative to the face 310 of the closure member 302 such that the bore 320 is inclined, sloped, angled etc. relative to the face 310 of the closure member 302.

In the example of FIGS. 3-5, the coupling apparatus 300 includes an expansion pin 322 having a bore 324 that extends therethrough to receive a first fastener or tapered pin 326 and a second fastener or tapered pin 328. As shown, an inner surface 330 of the opening 324 comprises a tapered shape or profile. However, in other examples, the opening 324 may have a straight profile or any other profile. A first portion or opening 332 of the inner surface 330 may be tapered (e.g., formed via a taper reamer) to provide a first tapered profile and a second portion or opening 334 of the inner surface 330 may be tapered to provide a second tapered profile. As shown, the first portion 332 includes a tapered portion that is opposite, inverse or a mirror-image relative to the tapered profile of the second portion 334.

The configuration of FIGS. 3-5 significantly facilitates manufacturing of the expansion pin 322 because the first and second tapered portions 332 and 334 can be reamed from a first end 336 and a second end 338, respectively. In other words, because the first and second portions 332 and 334 are reamed from the respective first and second ends 336 and 338, the depth required to ream each of the first and second portions 332 and 334 of the inner surface 330 is significantly reduced in contrast to an expansion pin that includes an opening that is reamed from only one end of the expansion pin (i.e., by reaming one-half the length of the expansion pin 322 compared to reaming the full length of the expansion pin 322). The first and second tapered profiles may be substantially the same or may be different.

Additionally, in this example, each of the first and second tapered pins 326 and 328 includes an outer surface having a tapered profile or shape. The first tapered pin 326 is disposed within the first portion 332 of the opening 324 adjacent the first end 336 of the expansion pin 322. Likewise, the second tapered pin 328 is disposed within the second portion 334 of the opening 324 adjacent the second end 338 of the expansion pin 322 opposite the first end 336. In this example, the tapered shape or profile of the first tapered pin 326 is complementary to the tapered profile or shape of the first portion 332 of the inner surface 330. Similarly, the tapered shape or profile(s) of the second tapered pin 328 is complementary with the tapered profile or shape of the second portion 334 of the inner surface 330. However, in other examples, the tapered profile(s) of the first and/or second tapered pins 326 and 328 may be different than the tapered profile(s) of the first and/or second portions 332 and 334 of the inner surface 330.

Referring to FIG. 4, to assemble and couple the valve shaft 304 to the closure member 302, the valve shaft 304 is disposed or received within the opening 308 of the body portion 306 so that the aperture 318 of the valve shaft 304 is substantially aligned with the aperture 312 of the closure member 302 to define or form the receiving bore 320. A first portion or edge 340 of the first tapered pin 326 is inserted or disposed (e.g., via a hand-tight fit) in the first portion 332 of the opening 324 adjacent the first end 336 of the expansion pin 322 prior to the expansion pin 322 being inserted in the receiving bore 320. In other words, the first pin 326 is disposed in the first portion 332 of the opening 324 adjacent the first end 336 of the expansion pin 322 such that the first tapered pin 326 does not cause the first end 336 of the expansion pin 322 to radially expand relative to the axis 314. Otherwise, if the first tapered pin 326 causes the first end 336 of the expansion pin 322 to expand beyond a diameter of the receiving bore 320, then the expansion pin 322 may not fit into the bore 320 during assembly.

Once the first portion 340 of the first tapered pin 326 is disposed within the first portion 332, the expansion pin 322 and the first tapered pin 326 assembly is disposed in the receiving bore 320 such that a second end 342 of the first tapered pin 326 engages the surface 316 of the aperture 312 of the closure member 304. At this stage of the assembly shown in FIG. 4, the expansion pin 322 may be driven further into the receiving bore 320 via, for example, a tool, to cause the first tapered pin 326 to move further into the first portion 332 of the opening 324 of the expansion pin 322. For example, the second end 338 of the expansion pin 322 may be pressed or driven via a tool to drive the expansion pin 322 toward the surface 316 of the aperture 312. In this manner, the tapered outer surface of the first tapered pin 336 engages the tapered inner surface of the first portion 332 to cause the expansion pin 322 to expand. As a result, as shown in FIG. 5, the first end 336 of the expansion pin 322 expands such that an outer surface 344 of the expansion pin 322 engages at least an inner surface 346 of the aperture 312 and an inner surface 348 of the aperture 318 at a first location 350 adjacent the first end 336 of the expansion pin 322. The first location 350 is a first (i.e., critical) valve shaft/closure member interface.

As shown in FIG. 5, the second tapered pin 328 is then inserted or disposed in the opening 324 adjacent the second end 338 of the expansion pin 322. The second tapered pin 328 is pressed or driven via, for example, a tool, to cause the second tapered pin 328 to move in the second portion 334 of the opening 324 toward the surface 316, thereby causing a second portion 352 of the expansion pin 322 to expand. The tapered outer surface of the second tapered pin 328 engages the tapered inner surface of the second portion 334 to cause the second portion 352 of the expansion pin 322 to expand. When the second portion 352 of the expansion pin 322 expands, the outer surface 344 of the expansion pin 322 engages at least the inner surfaces 346 and 348 of the respective apertures 312 and 318 at a second location 354 that is different than the first location 350. The second location 354 is a second (i.e., critical) valve shaft/closure member interface.

As the tapered pins 326 and 328 are disposed in the respective first and second portions 332 and 334 of the opening 324, the expansion pin 322 expands tightly against the inner surfaces 346 and 348 of the respective apertures 312 and 318 at the two different locations 350 and 354 to provide a self-locking apparatus or assembly, thereby eliminating the need to permanently attach (e.g., via welding) the tapered pins 326 and 328 to the expansion pin 322. In other words, if the expansion pin 322 moves or slides away from the surface 316 relative to the first tapered pin 326 (e.g., due to valve vibrations), the second tapered pin 328 causes the expansion pin 322 to expand further to prevent further movement of the expansion pin 322. Likewise, if the expansion 322 moves toward the surface 316 relative to the second tapered pin 328, the first tapered pin 326 causes the expansion pin 322 to expand further to prevent further movement of the expansion pin 322. Thus, the example coupling apparatus 300 described herein provides a self-locking assembly.

Additionally, because the expansion pin expands at two different locations 350 and 354 to provide a self-locking assembly, the coupling apparatus 300 substantially reduces or eliminates lost motion between the valve shaft 304 and the closure member 302 when the actuator rotates the valve shaft 304.

As shown in FIG. 5, the first and second tapered pins 326 and 328 and the expansion pin 322 may be dimensioned or sized to fit within the receiving bore 320 so that the coupling apparatus 300 is flush and/or recessed relative to a surface 356 of the closure member 302. Additionally or alternatively, although not required, the receiving bore 320 may receive a cap or a fastener (e.g., a weld, a glue, a paste, etc.) to encase the coupling apparatus 300 within the bore 320. The example coupling apparatus 300 may be factory installed and/or may be implemented with a fluid valve in the field. For example, the closure member 302, the valve shaft 304 and the coupling apparatus 300 may be used to implement the example valve 200 of FIGS. 2A and 2B.

The tapered pins 326 and 328 and the expansion pin 322 may be made of stainless steel (e.g., hardened stainless steel), and/or any other suitable material(s). Additionally, the tapered pins 326 and 328 and the expansion pin 322 made from the same material as the valve shaft 304 to eliminate or substantially reduce thermal expansion effects that may otherwise occur if the tapered pins 326 and 328 and/or the expansion pin 322 were made from a different material than the valve shaft 304. In this example, the valve shaft 304 and the closure member 302 are made of stainless steel. However, in other examples, the valve shaft 304 and the closure member 302 may be made of any other suitable material(s).

Although certain methods, apparatus and articles of manufacturing have been described herein, the scope of coverage of this patent is not limited thereto. To the contrary, this patent covers all methods, apparatus and articles of manufacturing fairly falling within the scope of the appended claims either literally or under the doctrine of equivalents.

What is claimed is:

1. A coupling apparatus for use with fluid valves, comprising:
    an expansion pin to be disposed in a receiving bore defined by a first aperture of a valve shaft and a second aperture of a closure member, wherein the first and second apertures are to be coaxially aligned when the valve shaft is coupled to the closure member, wherein the receiving bore is configured to form an axis that is non-parallel relative to a fluid engaging face of the closure member;
    a first tapered pin being non-threaded and disposed in a first opening of the expansion pin adjacent a first end of the expansion pin; and
    a second tapered pin being non-threaded and disposed in a second opening of the expansion pin adjacent a second end of the expansion pin, wherein the first tapered pin causes the expansion pin to expand at a first location when the first tapered pin is disposed in the first opening and the second tapered pin causes the expansion pin to expand at a second location different than the first location when the second tapered pin is disposed in the second opening.

2. A coupling apparatus as defined in claim 1, wherein the first opening of the expansion pin includes a first tapered profile and the second opening of the expansion pin includes a second tapered profile.

3. A coupling apparatus as defined in claim 2, wherein the first tapered pin or the second tapered pin includes a third tapered profile that is complementary to the first tapered profile or the second tapered profile.

4. A coupling apparatus as defined in claim 2, wherein the first tapered pin or the second tapered pin includes a third tapered profile that is different than the first tapered profile or the second tapered profile.

5. A coupling apparatus as defined in claim 2, wherein the first tapered pin or the second tapered pin includes a third tapered profile that matably engages to the first tapered profile or the second tapered profile.

6. A coupling apparatus as defined in claim 1, wherein the first aperture of the valve shaft or the second aperture of the closure member is formed in the field.

7. A coupling apparatus as defined in claim 1, wherein the receiving bore is substantially perpendicular to the face of the closure member.

8. A coupling apparatus as defined in claim 1, wherein each of the first opening and the second opening of the expansion pin has a depth that is less than an overall length of the expansion pin.

9. A coupling apparatus of claim 1, wherein the expansion pin has a cylindrical shape.

10. A coupling apparatus of claim 1, wherein the receiving bore does not extend through a face of the closure member.

11. A coupling apparatus of claim 1, wherein the first tapered pin is to cause the expansion pin to further expand at the first location when the expansion pin moves away from the second location and the second tapered pin is to cause the expansion pin to further expand at the second location when the expansion pin moves away from the first location to limit movement of the expansion pin within the receiving bore.

12. A fluid valve comprising:
    means for controlling fluid flow through a fluid flow passageway;
    means for coupling the means for controlling to means for actuating the means for controlling, the means for coupling and the means for controlling defining a bore having an axis that intersects a longitudinal axis of the means for coupling when the means for coupling is coupled to the means for controlling, the bore configured to receive means for expanding;
    first means for causing the means for expanding to expand at a first location of the bore at a first interface between the means for coupling and the means for controlling; and
    second means for causing the means for expanding to expand at a second location of the bore at a second interface between the means for coupling and the means for controlling that is different than the first interface, the first and second means for causing the means for expanding to expand being non-threaded to enable the means for expanding to further expand at the first interface when the means for expanding moves away from the second interface and cause the means for expanding to further expand at the second interface when the means for expanding moves away from the first interface.

13. A fluid valve of claim 12, wherein the first means for causing the means for expanding to expand at a first location is disposed in a first opening adjacent a first end of the means for expanding.

14. A fluid valve of claim 13, wherein the second means for causing the means for expanding to expand at a second location is disposed in a second opening adjacent a second end of the means for expanding.

15. A fluid valve of claim 12, wherein the first means for causing the means for expanding to expand comprises a first tapered pin and the second means for causing the means for expanding to expand comprises a second tapered pin.

16. A valve apparatus comprising:
    an expansion pin to be positioned in an opening of a closure member, the closure member receiving a valve shaft, the valve shaft having a hole that has an axis that intersects a central axis of the valve shaft, the hole of the valve shaft to align with the opening of the closure member to define a receiving bore, the expansion pin having a first opening adjacent a first end of the expansion pin and a second opening adjacent a second end of the expansion pin, the first end being opposite the second end;
    a first tapered pin to be provided in the first opening of the expansion pin such that a first portion of the expansion pin adjacent the first end does not expand until the first tapered pin and the expansion pin are positioned in the receiving bore of the closure member and the valve shaft, the first tapered pin to cause a first portion of the expansion pin to expand against an inner surface of the receiving bore at a first location when the expansion pin is moved relative to and toward the first tapered pin; and a second tapered pin to be provided in the second opening of the expansion pin to cause a second portion adjacent a second end of the expansion pin to expand against the inner surface of the receiving bore at a second location different from the first location, the first and second tapered pins being non-threaded to enable the first and second tapered pins to slide within the respective first and second openings of the expansion pin to enable the expansion pin to further expand at the first location when the expansion pin moves away from the second location and to further expand at the second location when the expansion pin moves away from the first location.

17. A valve apparatus of claim 16, wherein the first opening includes a first tapered inner surface and the second opening includes a second tapered inner surface.

18. A valve apparatus of claim 16, wherein the hole and the opening are substantially perpendicular to a face of the closure member.

19. A valve apparatus of claim 16, wherein the first tapered pin is inserted within the first opening of the expansion pin via a hand tight fit so that the expansion pin does not expand prior to being positioned in the receiving bore.

20. A valve apparatus of claim 16, wherein the second tapered pin causes the expansion pin to expand toward the inner surface of the receiving bore when the second tapered pin is moved toward and relative to the expansion pin.

21. A valve apparatus of claim 16, wherein the second tapered pin and the expansion pin are flush relative to an outer surface of the closure member opposite the face of the closure member when the second end of the expansion pin is expanded against the inner surface of the receiving bore.

* * * * *

UNITED STATES PATENT AND TRADEMARK OFFICE
CERTIFICATE OF CORRECTION

| | | |
|---|---|---|
| PATENT NO. | : 8,752,809 B2 | Page 1 of 1 |
| APPLICATION NO. | : 12/716934 | |
| DATED | : June 17, 2014 | |
| INVENTOR(S) | : Paul Russell Dalluge and Ross Eugene Long | |

It is certified that error appears in the above-identified patent and that said Letters Patent is hereby corrected as shown below:

In the Claims:

Column 10, line 50 (Claim 16) remove "to be"

Signed and Sealed this
Sixteenth Day of September, 2014

Michelle K. Lee
*Deputy Director of the United States Patent and Trademark Office*